United States Patent
Cooper et al.

(10) Patent No.: US 6,955,377 B2
(45) Date of Patent: Oct. 18, 2005

(54) INFLATABLE RESTRAINT MODULE WITH EXTERNAL TETHER

(75) Inventors: John Cooper, Oxford, MI (US); John M. Burdock, St. Clair Shores, MI (US); Jin Ho Jung, Rochester Hills, MI (US); Robert L. Arwood, III, Fraser, MI (US); Robert J. Sadenwater, Clarkston, MI (US); Walter R. Green, Pontiac, MI (US); Mutaz A. Shkoukani, Fraser, MI (US); Jean-Luc Blancou, Troy, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

(21) Appl. No.: 10/370,394

(22) Filed: Feb. 20, 2003

(65) Prior Publication Data
US 2003/0189328 A1 Oct. 9, 2003

Related U.S. Application Data

(60) Provisional application No. 60/370,773, filed on Apr. 6, 2002.

(51) Int. Cl.$^7$ ............................................. B60R 21/16
(52) U.S. Cl. ................................ 280/743.1; 280/743.2
(58) Field of Search ....................... 280/743.2, 743.1

(56) References Cited

U.S. PATENT DOCUMENTS

| | | |
|---|---|---|
| 3,879,056 A | 4/1975 | Kawashima et al. |
| 5,004,266 A | 4/1991 | Miller et al. |
| 5,062,664 A | 11/1991 | Bishop et al. |
| 5,335,936 A | 8/1994 | Faigle et al. |
| 5,348,343 A | 9/1994 | Hawthorn |
| 5,447,329 A | 9/1995 | Hamada |
| 5,498,023 A | 3/1996 | Adams et al. |
| 5,560,648 A | 10/1996 | Rhule et al. |
| 5,603,523 A | 2/1997 | Rhule et al. |
| 5,630,614 A | 5/1997 | Conlee et al. |
| 5,727,812 A * | 3/1998 | Dykstra et al. ............. 280/731 |
| 5,765,867 A | 6/1998 | French |
| 5,810,385 A | 9/1998 | Henseler et al. |
| 6,145,872 A | 11/2000 | Soderquist et al. |
| 6,189,915 B1 | 2/2001 | Soderquist et al. |
| 6,273,454 B1 | 8/2001 | Olivas et al. |
| 6,334,627 B1 | 1/2002 | Heym et al. ............. 280/743.2 |
| 6,431,589 B1 | 8/2002 | Heigl et al. |
| 6,435,554 B1 | 8/2002 | Feldman |
| 6,464,246 B2 | 10/2002 | Bayley |
| 2001/0035639 A1 | 11/2001 | Amamori ................... 280/740 |

FOREIGN PATENT DOCUMENTS

| | | |
|---|---|---|
| DE | 19536603 A1 | 4/1997 |
| GB | 2357999 | 7/2001 |
| WO | WO97/06984 | 2/1997 |

* cited by examiner

*Primary Examiner*—Eric Culbreth
(74) *Attorney, Agent, or Firm*—Markell Seitzman

(57) ABSTRACT

An air bag module comprising an air bag pack including an inflator and folded air bag is disclosed; the air bag is capable of inflating upon receipt of inflation gas and includes a tether having a first portion fixedly attached in relation to one of the air bag and the inflator, the tether including a second portion, which is loosely positioned relative to the first portion.

18 Claims, 4 Drawing Sheets

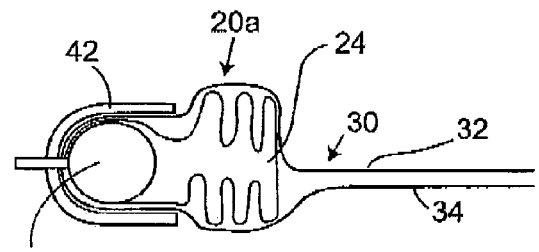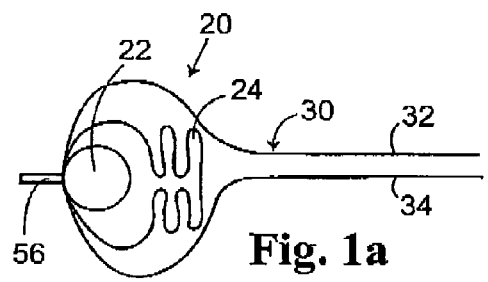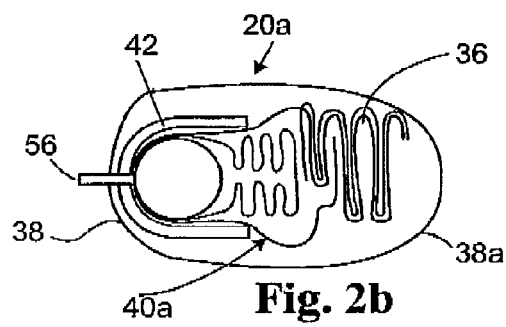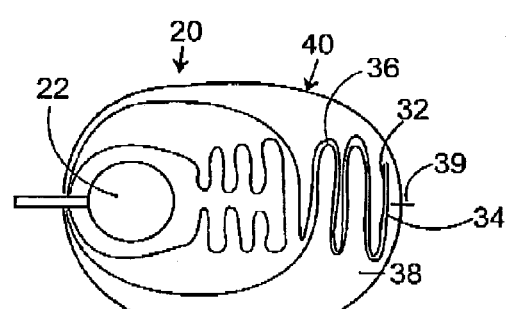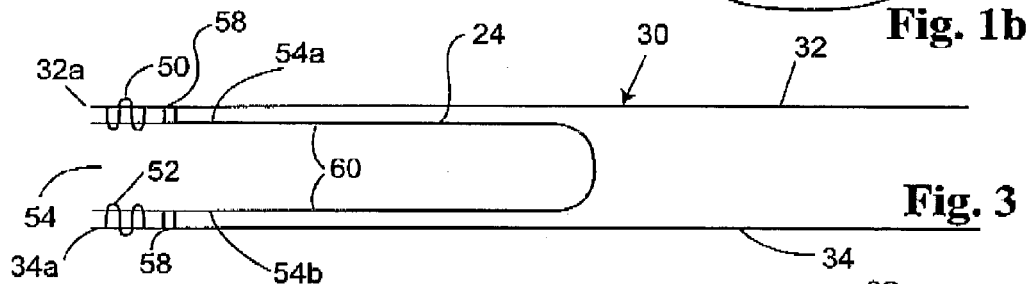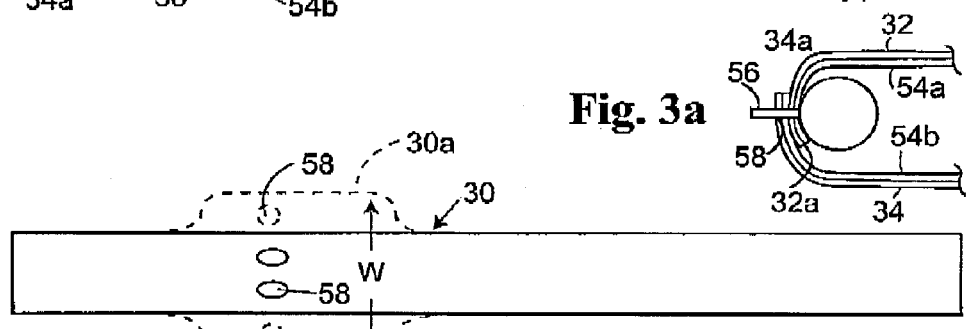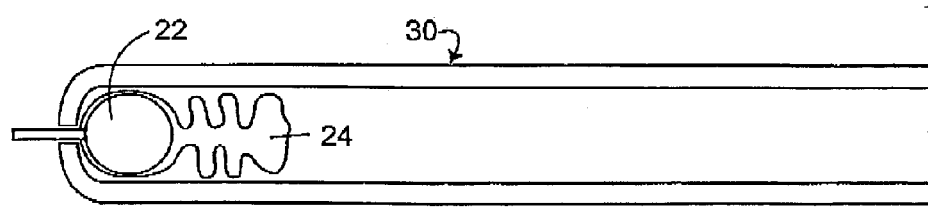

INFLATABLE RESTRAINT MODULE WITH EXTERNAL TETHER

This is a regularly filed utility patent application claiming priority of provisional patent application No. 60/370,773, filed Apr. 6, 2002.

The present invention generally relates to an air bag or air bag module having an external tether. The function of a tether, whether internal or external, is to slow the motion of the deploying air bag and guide its motion relative to the occupant to be protected.

Accordingly the invention comprises: an air bag module comprising: an air bag pack including an inflator and folded air bag; the air bag is capable of inflating upon receipt of inflation gas. The module includes a tether having a first portion fixedly attached in relation to one of the air bag and the inflator, and the tether includes a second portion, which is loosely positioned relative to the first portion.

Many other objects and purposes of the invention will be clear from the following detailed description of the drawings.

BRIEF DESCRIPTION OF THE DRAWINGS

FIGS. 1a and 1b show a first embodiment of the invention.

FIGS. 2a and 2b show a second embodiment of the invention.

FIG. 3 illustrates the interconnection of an air bag to an external tether.

FIG. 3a is a cross-sectional view showing a more detailed relationship of an air bag and inflator.

FIG. 4 shows an alternative tether.

FIG. 5 shows the alternative tether mounted about an air bag and inflator.

DETAILED DESCRIPTION OF THE DRAWINGS

Figure 6:
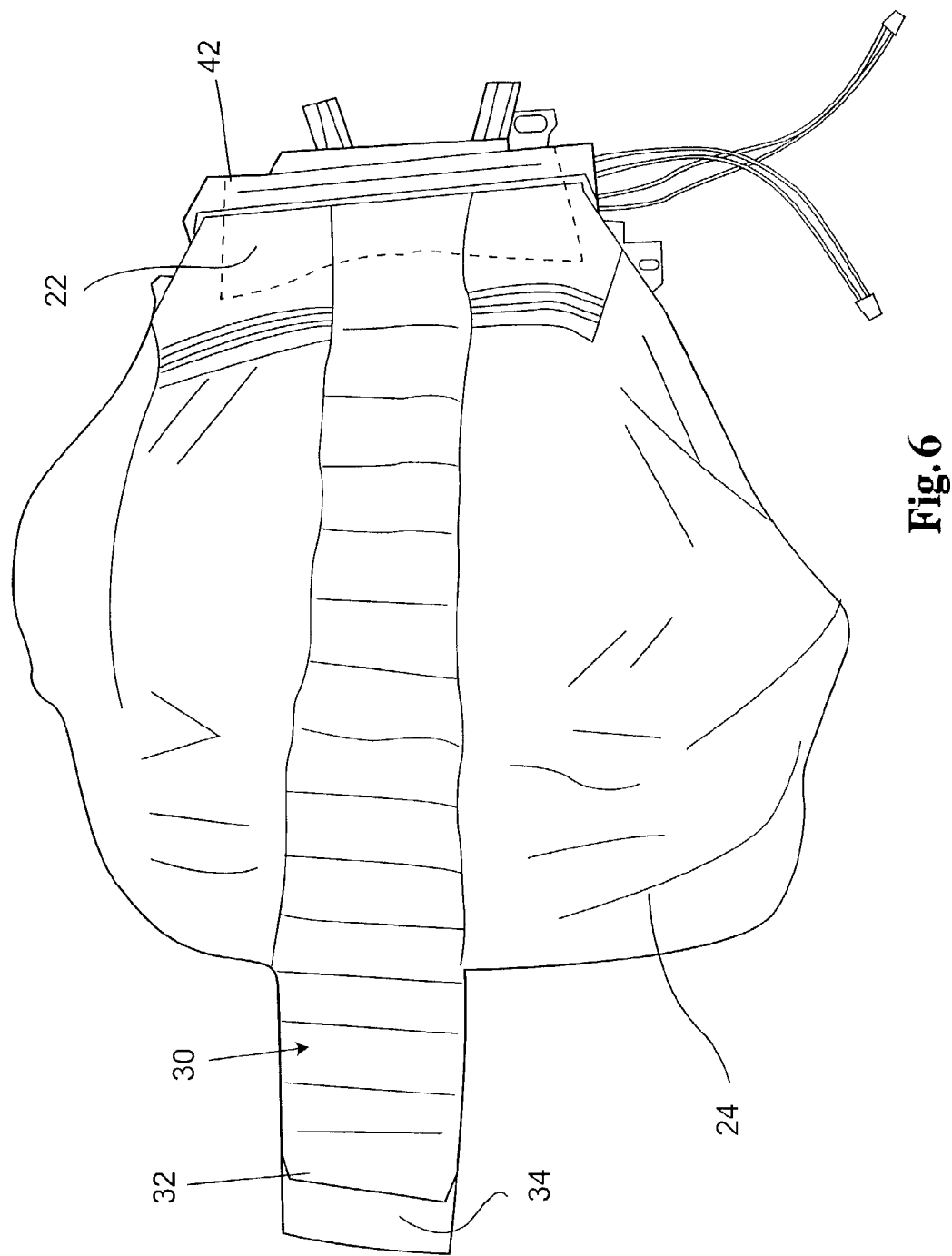
FIG. 6 shows many of the major portions of the present invention.

Reference is made to FIGS. 1a and 1b, which illustrate an air bag module 20 incorporating the present invention. The module 20 includes an air bag inflator 22, and an air bag 24 that prior to inflation is presented in a compact or folded condition about the inflator. Extending about the inflator and folded air bag 24 is an external tether generally shown by numeral 30 having a first or upper tether portion 32 and a second or lower tether portion 34.

In the illustrated embodiment, the first or upper and second or lower tether portions 32 and 34 respectively extend over the top and bottom (upper side and lower side) of the folded air bag 24. If the inflator is mounted vertically (not shown) the tether portions would extend from either the left or right-hand sides of the air bag. The tether portions 32 and 34 are substantially the same size (but this is not a requirement as the lengths may vary somewhat) and are aligned and registered one to the other, that is to the extent possible the tether portions are placed on top of each other. Thereafter, the aligned and registered tether portions (also called tether flaps) 32 and 34 are rolled or folded in a plurality of accordion pleats (see numeral 36 of FIG. 1b). The pleated or rolled tethers 32 and 34 (together referred to by numeral 36) are positioned atop the folded air bag 24, that is, positioned upon the inflator in the direction in which the air bag will generally inflate. To maintain the air bag and tether in a folded state a tearable cover or panel made of a frangible material 38 is shown enveloping the air bag 24.

In the embodiment illustrated in FIGS. 1a and 1b, the inflator 22, the folded air bag 24 and folded, pleated or rolled tethers 36 and the sack or material 38 are referred to as a bag pack 40. The covering material or sack 38 may include a line of tearable perforations 39 as used in the art.

Reference is briefly made to FIGS. 2a and 2b, which show an alternate embodiment of the invention. In this alternate embodiment of the invention the bag pack 40a only consists of the inflator and the folded air bag 24 and tether 30, which form part of air bag module 20a. This bag pack 40a is shown inserted within a housing 42. Thereafter the sack or tearable material 38a is placed about and envelops the housing and bag pack 40a. Or course the bag pack 40 of FIG. 1a can simply be inserted within a housing 42, in which case the externally positioned tearable material 38a need not be used.

Reference is briefly made to FIG. 3, which illustrates the air bag 24 and tether 30. In this embodiment the tether flaps or portions 32 and 34 are separate and distinct pieces of material, each of which is respectively sewn (see seams 50 and 52) or otherwise secured (stapled, welded, glued) to opposing portions 54a and 54b, of the neck 54 of the air bag 24. These neck portions 54a and 54b and tether portions 32 and 34 may include one or more mounting openings 58 (which correspond to at least some of the number of studs 56 extending from the inflator 22). It should be appreciated, as known in the art, the studs can extend from a manifold or housing. Ends 32a and 34a of each tether portion 32 and 34 and the neck portions 54a and 54b are overlapped about the mounting fasteners or studs 56 to achieve the overlapped configuration as illustrated in FIG. 3a. It can be appreciated it is not necessary to connect the tethers or tether portions 32 and 34 to the neck 54 of the air bag; the tethers can be attached at other locations on the air bag. For example, the tethers (tether portions 32 and 34) can be sewn to respectively opposing portions of the air bag, at locations designated by numbers 60, which are remote from the neck 54.

FIG. 4 shows an alternative embodiment of the tether. As can be appreciated, the tether 30 can be manufactured utilizing a single length of material having a plurality of mounting openings 58 therein. The number of mounting openings corresponds to the number (or at least some) fastening bolts 56. For example, if the inflator is wider than the width of the tether 30, the tether 30 can be made with a localized extension having an increased width (w) portion 30a, shown in phantom line, which can accommodate a larger number of mounting studs.

FIG. 5 illustrates a one-piece tether 30 mounted about the inflator 22 and folded air bag 24.

Reference is made to FIG. 6, which shows an air bag 22 extending from a housing 42. The air bag 22 is, for the purposes of illustration, laid flat on a work surface with the tether 30 and in particular the top tether portion 32 extending on the upper side of the air bag. The lower portion 34 of the tether 30 is positioned below, and extends somewhat beyond the end of the upper tether 32.

Figure 7B:
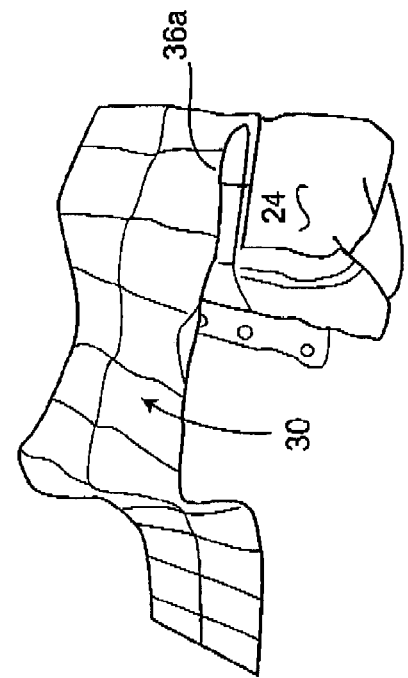
FIGS. 7a–7d illustrate the method of assembly of the present invention.
Figure 7D:
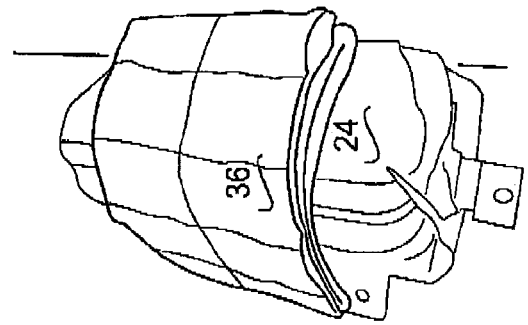
Figure 7A:
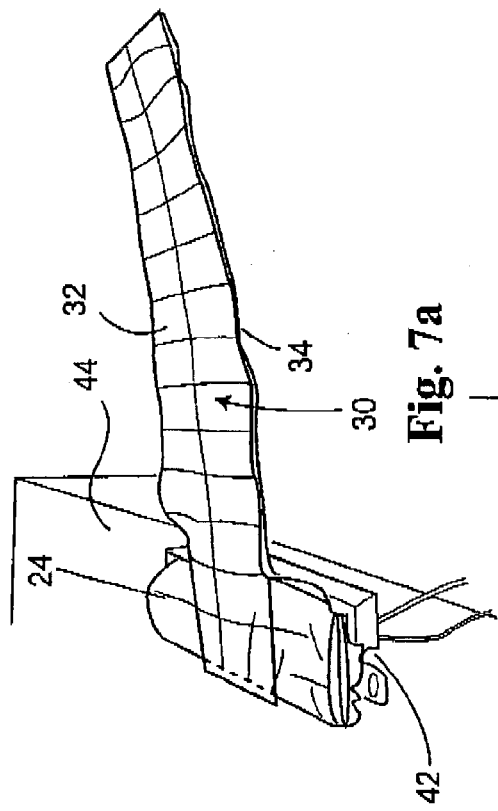
Figure 7C:
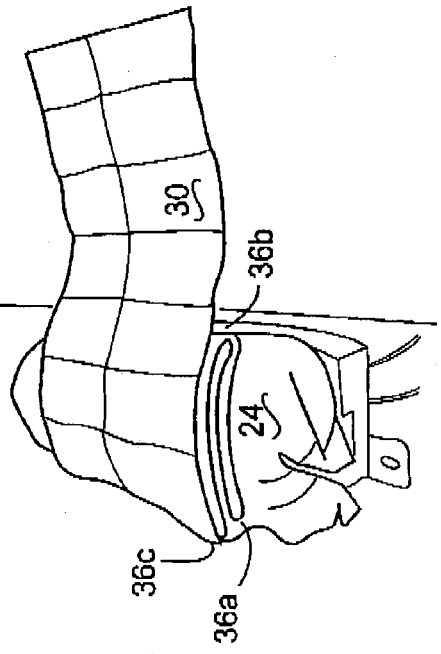

Reference is briefly made to FIG. 7a, which illustrates a folded air bag 24, positioned within a housing 42 and located on a work surface 44. The folded air bag 22 takes the form of a cylinder and is placed within and may partially extend from the housing 42. In FIG. 7a, the upper 32 and lower 34 tether portions are shown pulled or extended outwardly from the folded air bag at their full length. In FIG. 7b, that portion of the tether 30 near the air bag and housing is folded into first accordion pleat 36a. Thereafter the remaining portions of the tether 30 are folded into more pleats such as 36b and 36c (as shown in FIG. 7c). FIG. 7d shows the pleated tether portions 36 positioned on top of the folded air bag, in a manner similar to the embodiments shown in FIGS. 1a and 1b.

Figure 8:
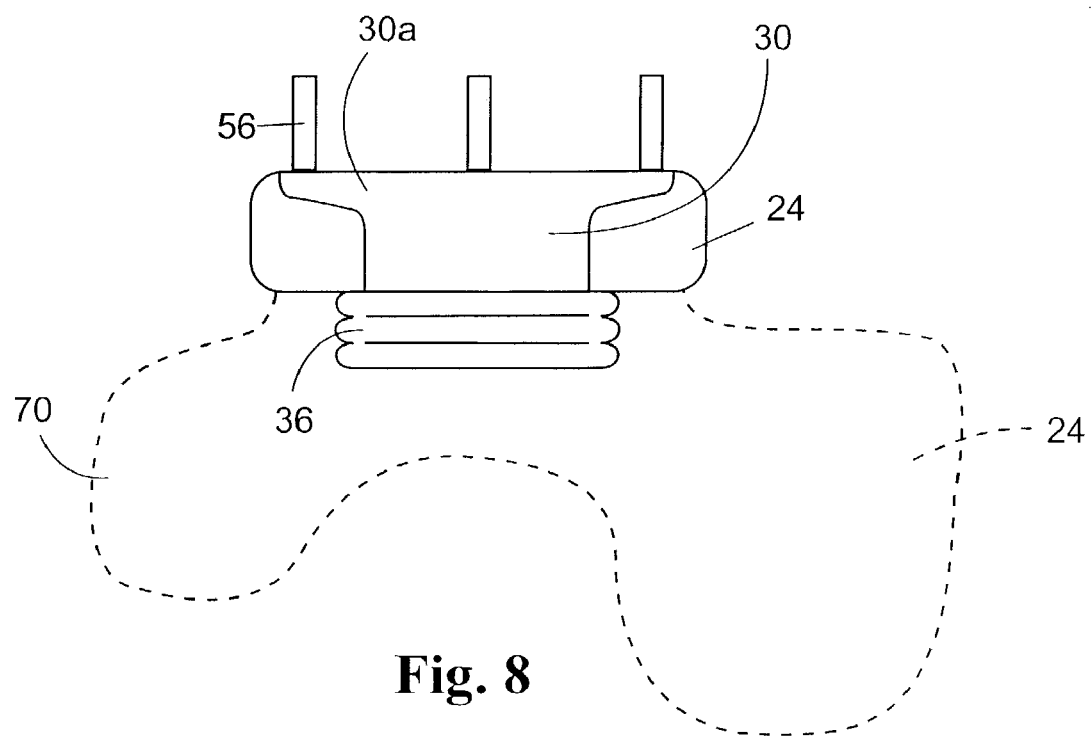
FIG. 8 is a plan view showing an air bag partially inflated.

As can be seen, the folded or rolled tether 30 (or tether portions 32 and 34) is shown in FIG. 8 generally positioned in and about the center of the folded air bag. While not shown, the sack or breakable material 38 would envelop the air bag and the tether and hold same to the inflator in a compact configuration. Upon receipt of inflation gas the air bag will tend to inflate; however, the rolled or accordion folded tether 30 will provide a measure of resistance to the inflating bag (during the initial moments of inflation), that is, in the vicinity of the folded (pleated) portion 36 of the tether 30, thereby slowing the inflation of that related portion of the air bag. As can be seen by the phantom lines 70 in FIG. 8, with the folded tether portions 36 centrally positioned, the air bag will tend to initially inflate outwardly on either side of the still folded or partially folded tether 30. As the air bag continues to inflate, the central portion of the air bag will tend to also push the tether portions 32 and 34 apart and, as long as the tether portions remain relatively folded or pleated, they will tend to stay together and thereby retard or delay the inflation of the center portion of the air bag until the lethers am pushed apart.

Figure 9:
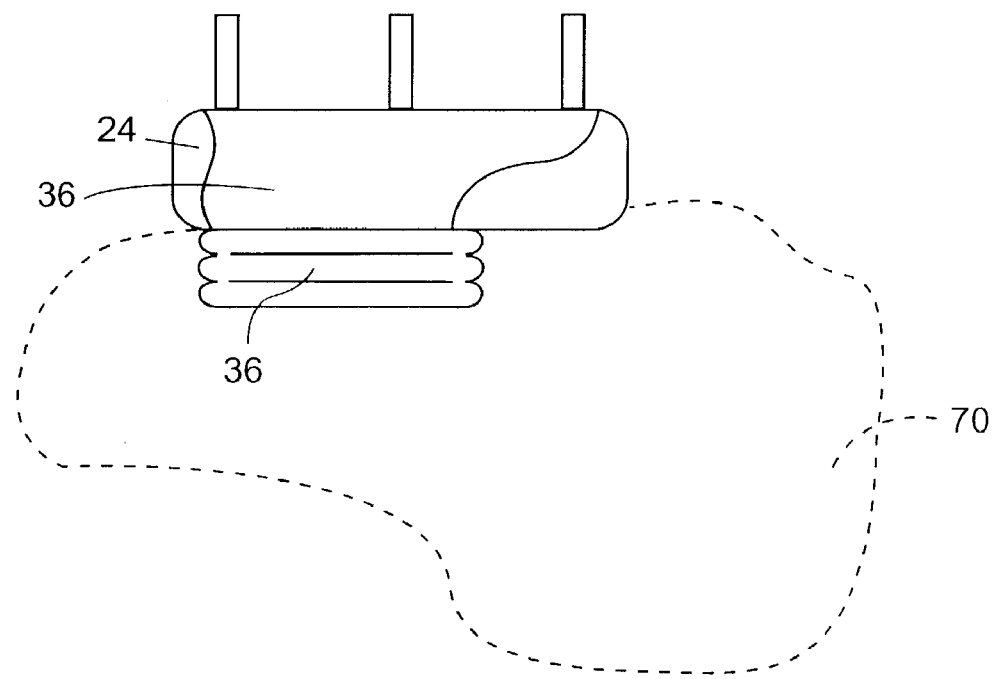
FIG. 9 illustrates an alternate embodiment of the invention.

Reference is briefly made to FIG. 9, which illustrates the folded or tether portions 36 positioned off-center (biased to one side) relative to the folded air bag 24 in comparison with the earlier embodiments, which described a folded tether positioned centrally of the folded air bag 22. As can be appreciated, in this embodiment the inflation of the left-hand portion of the air bag (in relation to that shown in FIG. 9) will be delayed somewhat in its inflation relative to the right-hand portion of the air bag, as also illustrated by phantom line 70. Subsequently, as the air bag inflates, the tether or tether portions (using one-piece or multiple piece tethers) will generally be positioned oppositely relative to the fully inflated air bag. One of the benefits of the present invention is the tether portions are not sewn or physically joined together at their extreme ends. As can be appreciated, the folded tether 36 can be positioned on the side opposite that illustrated in FIG. 9.

Many changes and modifications in the above-described embodiment of the invention can, of course, be carried out without departing from the scope thereof. Accordingly, that scope is intended to be limited only by the scope of the appended claims.

What is claimed is:

1. An air bag module comprising:
    an air bag pack including an inflator and folded air bag of a first width, the air bag capable of inflating upon receipt of inflation gas and
    a tether having a first portion fixedly attached in relation to one of a portion of the air bag and the inflator, the tether including a second portion comprising a pair of tether flaps or panels configured to envelop opposing sides of the folded air bag, respective distal end regions of the tether flaps or panels positioned in contacting registration to each other, though not attached to each other or attached to another portion of the module, the distal regions of a second width narrower than the first width, a segment of the flaps formed into the contacting registration located adjacent the folded air bag.

2. The air bag module as defined in claim 1 wherein the tether comprises a length of material configured in a U-shape having a center and two extending legs which respectively form the tether flaps or panels, wherein the center of the material is fixedly located relative to the inflator and wherein a first portion of each leg of the material extends oppositely about the folded air bag and wherein a second portion of each leg is configured in mutual overlapping relation with a similar second portion of the other leg.

3. The module as defined in claim 2 wherein the overlapped second portions of each leg are configured into a mutually enveloping physical orientation and positioned upon the folded air bag.

4. The module as defined in claim 3 wherein each second portion is folded into a plurality of mutually overlapping pleats and located upon the folded air bag.

5. The module as defined in claim 2 wherein the first portion of one of the legs envelops a determinable area of the folded air bag while the first portion of the other leg envelops a greater area of the folded air bag.

6. The module as defined in claim 2 wherein the width of the tether proximate its center is wider than the legs of the tether.

7. The module as defined in claim 2 wherein the center of the tether includes a plurality of openings for receipt of fasteners.

8. The module as defined in claim 2 wherein the material proximate the inflator has a predetermined width and wherein the width of the extending legs remote from the inflator is less than the width of the material proximate the inflator.

9. The module as defined in claim 1 wherein the tether flaps are one of equal and unequal in length.

10. An air bag module comprising:
    an air bag pack including an inflator and folded air bag, the air bag capable of inflating upon receipt of inflation gas and
    a tether having a first portion fixedly attached to a portion of the module, the tether including a pair of tether flaps or panels configured to envelop opposing sides of the folded air bag while also positioned on top of the folded air bag, respective distal end regions of the tether flaps or panels positioned in contacting registration to each other though not physically secured to each other, a segment of the flaps in the contacting registration formed into a separatable configuration located adjacent the top of the folded air bag prior to inflation of the air bag, and wherein that portion of the flaps in contacting registration is displaced laterally along an axis of the folded air bag.

11. The module as defined in claim 10 wherein the tether flaps are one of equal and unequal in length.

12. The module as defined in claim 11 wherein the tether flaps are one of equal and unequal in width.

13. An air bag module comprising:
    an air bag pack including an inflator and folded air bag, the air bag capable of inflating upon receipt of inflation gas and
    a tether comprising two pieces of material wherein a first portion of each piece is secured directly to portions of the air bag, each piece of material including a second portion together comprising a pair of tether flaps or panels configured to envelop opposing sides of the folded air bag, respective distal end regions of the tether flaps or panels positioned in contacting registration to each other, though not secured to each other, a segment of the flaps formed into the contacting registration located adjacent the folded air bag.

14. The module as defined in claim 13 wherein the tether flaps are one of equal and unequal lengths.

15. The module as defined in claim 13 wherein a width of the respective distal end regions is narrower than a width of the folded air bag.

16. The module as defined in claim 13 wherein each piece of material is directly secured proximate a neck region of the air bag.

17. The module as defined in claim 13 wherein each piece of material is directly secured to the air bag remote from a neck region of the air bag.

18. The module as defined in claim 13 wherein the first portion of each piece of material is secured proximate a neck portion of the air bag.

* * * * *